United States Patent
Jourdan et al.

(10) Patent No.: US 7,444,457 B2
(45) Date of Patent: Oct. 28, 2008

(54) RETRIEVING DATA BLOCKS WITH REDUCED LINEAR ADDRESSES

(75) Inventors: Stephan J. Jourdan, Portland, OR (US); Chris E. Yunker, Beaverton, OR (US); Pierre Michaud, Bruz (FR)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 10/743,285

(22) Filed: Dec. 23, 2003

(65) Prior Publication Data
US 2005/0138321 A1    Jun. 23, 2005

(51) Int. Cl.
*G06F 12/08* (2006.01)
(52) U.S. Cl. .......................... 711/3; 711/118
(58) Field of Classification Search ............... 711/3, 711/118
See application file for complete search history.

(56) References Cited

U.S. PATENT DOCUMENTS 6,161,166 A * 12/2000 Doing et al. ............... 711/125

OTHER PUBLICATIONS

Main et al., Data Structures and Other Objects Using C++, Aug. 1998, Addison Wesley, pp. 544-560.*

* cited by examiner

*Primary Examiner*—Kevin Ellis
*Assistant Examiner*—Jared I Rutz
(74) *Attorney, Agent, or Firm*—Kenyon & Kenyon LLP

(57) ABSTRACT

Systems and methods of processing addresses provide for receiving a full linear address of an instruction and reducing a size of the full linear address to obtain a reduced linear address. A data block can be retrieved from a data array if the reduced linear address corresponds to a tag in a tag array, where the tag array is associated with the data array. The reduced linear address enables the tag array to either be smaller in size or achieve enhanced performance. The data array may be a prediction array of a branch predictor or a cache array of a cache.

26 Claims, 5 Drawing Sheets

RETRIEVING DATA BLOCKS WITH REDUCED LINEAR ADDRESSES

BACKGROUND

1. Technical Field

Embodiments of the present invention generally relate to computers. More particularly, embodiments relate to retrieving data blocks in computer processing architectures.

2. Discussion

In the computer industry, the demand for higher processing speeds is well documented. While such a trend is highly desirable to computers, it presents a number of challenges to industry participants. A particular area of concern is data retrieval.

Modern day computer processors are organized into one or more "pipelines," where a pipeline is a sequence of functional units (or "stages") that processes instructions in several steps. Each functional unit takes inputs and produces outputs, which are stored in an output buffer associated with the stage. One stage's output buffer is typically the next stage's input buffer. Such an arrangement allows all of the stages to work in parallel and therefore yields greater throughput than if each instruction had to pass through the entire pipeline before the next instruction could enter the pipeline. In order to maximize the speed at which instructions are fed into the pipelines, data blocks including the instructions are organized into prediction arrays and various levels of cache, such as trace cache, instruction cache, etc. The prediction and cache architectures can be accessed relatively quickly and help reduce the need to access slower, off-chip memory.

When a full linear address of a data block is encountered, the data block is retrieved from a respective data array if the full linear address corresponds to a tag in a tag array, where the tag array is associated with the data array. If the data array is a prediction data array, the data block includes a branch prediction address having a size that equals the size of the full linear address. If the data array is a cache array, the data block includes, inter alia, a stored linear address having a size that equals the size of the full linear address. In either case, the tag array is indexed based on the full linear address, and therefore must be sized accordingly. As a result, fewer entries are available for the same sized data array, or a larger data array is required for the same number of entries. Since more entries are known to enhance performance, a difficult tradeoff must often be made between size and performance. There is therefore a need for an approach to processing addresses that enables the use of smaller tag arrays and therefore larger data arrays within a fixed area budget (number of bits).

BRIEF DESCRIPTION OF THE DRAWINGS

The various advantages of embodiments of the present invention will become apparent to one skilled in the art by reading the following specification and appended claims, and by referencing the following drawings, in which:

FIG. 5 is a block diagram of an example of a processor pipeline according to one embodiment of the invention.

DETAILED DESCRIPTION

Figure 1:
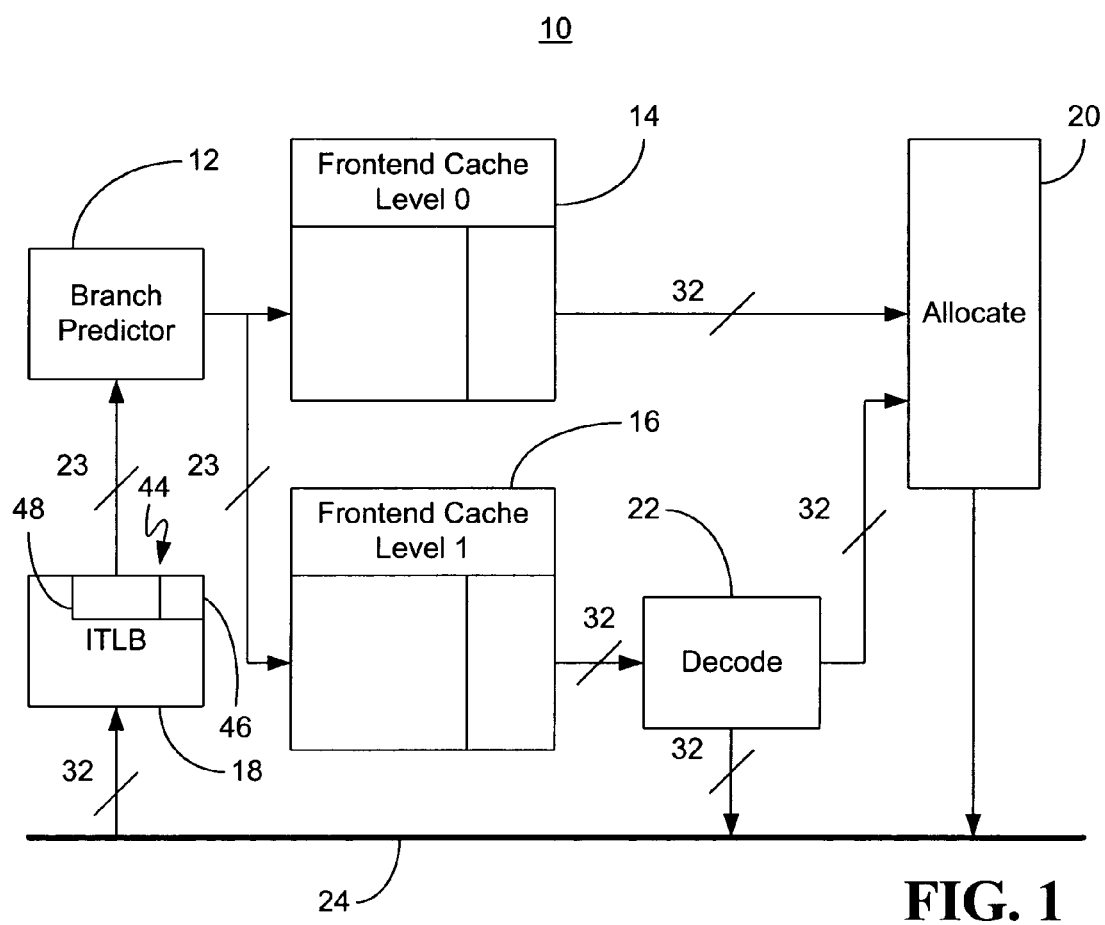
FIG. 1 is a block diagram of an example of a front end architecture according to one embodiment of the invention.

FIG. 1 shows a front end architecture 10 in which reduced linear addresses are used to reduce the size of the tag arrays associated with branch predictor 12, front end cache level 0 (FC0) 14 and front end cache level 1 (FC1) 16 and/or to enhance the performance associated with the tag arrays by increasing the number of available entries. Architecture 10 has an instruction translation look-aside buffer (ITLB) 18 that contains next instruction pointer (IP) logic (not shown) and an address processing unit 44. When buffer 18 receives a full linear address from processor bus 24, a reduction module 46 reduces the size of the full linear address to obtain a reduced linear address. In the illustrated example, the full linear address is thirty-two bits and the reduced linear address is twenty-three bits. Specific address sizes are provided to facilitate discussion only. Accordingly, larger or smaller values may be readily substituted for the values provided without parting from the spirit and scope of the embodiments of the invention.

A retrieval module 48 retrieves a data block from a branch predictor 12 prediction array if the reduced linear address corresponds to a tag in a tag array, where the tag array is associated with the prediction array. The reduced linear address enables the tag array of the branch predictor 12 to be smaller than in conventional approaches. The data block that is retrieved from the prediction array includes a branch prediction address having a size that equals the size of the reduced linear address. Thus, the branch prediction address is twenty-three bits long in the illustrated example.

In one approach, the cache arrays of FC0 14 and FC1 16 include a stored linear address having a size that equals the size of the full linear address. Thus, the cache arrays can be indexed with a smaller input barrier while the retrieved data block can be verified for accuracy. Alternatively, if the address reduction process is readily reversible, storage of the full linear address can be avoided by working backward from the branch prediction address for verification.

The illustrated FC0 14 is a trace cache, where allocation module 20 verifies that either the data block is consecutive with respect to a previous data block or the stored linear address corresponds to a calculated branch target address. Verification of whether the data block is consecutive can be performed by comparing the stored linear address, which can be viewed as a current linear instruction pointer (CLIP), with the next LIP (NLIP) from the preceding access to the trace cache. In this regard, the FC0 14 stores sequences of micro-operations, and functions essentially as a linked list. As a result, the data block retrieved from FC0 14 will also include an NLIP, which can be compared to the stored linear address of the next data block. Verification of whether the stored linear address corresponds to a calculated branch target address is performed when a misprediction has occurred and therefore the NLIP from the previous access is not valid.

It will also be appreciated that FC1 16 is illustrated as being an instruction cache where a decoder/branch address calculator (BAC) 22 decodes the data block and the allocation module 20 verifies that either the data block is consecutive with respect to a previous data block or the stored linear address corresponds to a calculated branch target address. Bus 24 interconnects the buffer 18, the decoder 22 and the allocation module 20.

Figure 2:
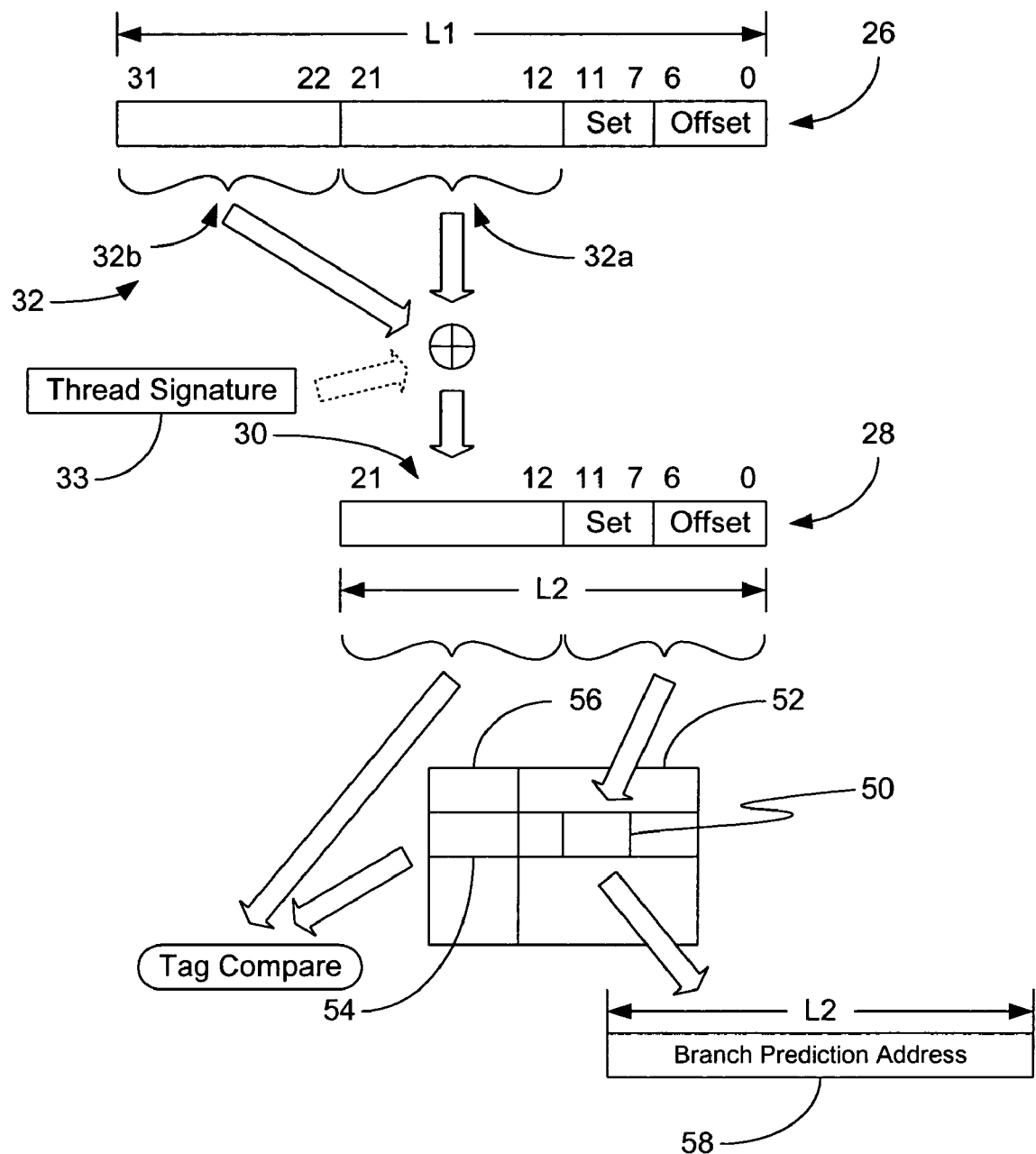
FIG. 2 is a diagram of an example of a branch predictor that is accessed with a reduced linear address according to one embodiment of the invention.

Turning now to FIG. 2, the relationship between a full linear address 26 and a reduced linear address 28 is shown in greater detail. Generally, a subset of the full linear address 26 is hashed to reduce the size of the full linear address 26. Specifically, the full linear address includes one or more line offset bits and one or more set index bits, where the set index bits and the offset bits are isolated from the hashing operation. Remaining bits 32 (32a, 32b) are hashed down to a reduced subset of bits 30. Thus, full linear address has a length of L1, whereas reduced linear address 28 has a length of L2.

The illustrated hashing operation is represented by H(22..12)=L(31..22)^L(21..12). It should be noted that bits zero through eleven are isolated from the hashing because they identify the data block 50 within data array 52. As a result, the indexing operation is faster. The reduced subset of bits 30, on the other hand, is compared to a tag 54 in tag array 56. The illustrated tag array 56 and data array 52 are part of a branch predictor such as branch predictor 12 (FIG. 1). Thus, the retrieved data block 50 includes a branch prediction address 58 that has a size that equals the size of the reduced linear address 28 (i.e., L2). A thread signature 33 can also be hashed with the remaining bits 32 to remove aliasing across threads that use the same linear address range. An example of such an approach can be represented by S(3.0)L(31..24)^L (23..12). In addition, the size of the reduced linear address 30 (i.e., L2) can be increased to further reduce aliasing. For example, adding a bit to the reduced linear address 28 doubles the number of addresses that can be represented and therefore halves the amount of aliasing present.

Figure 3:
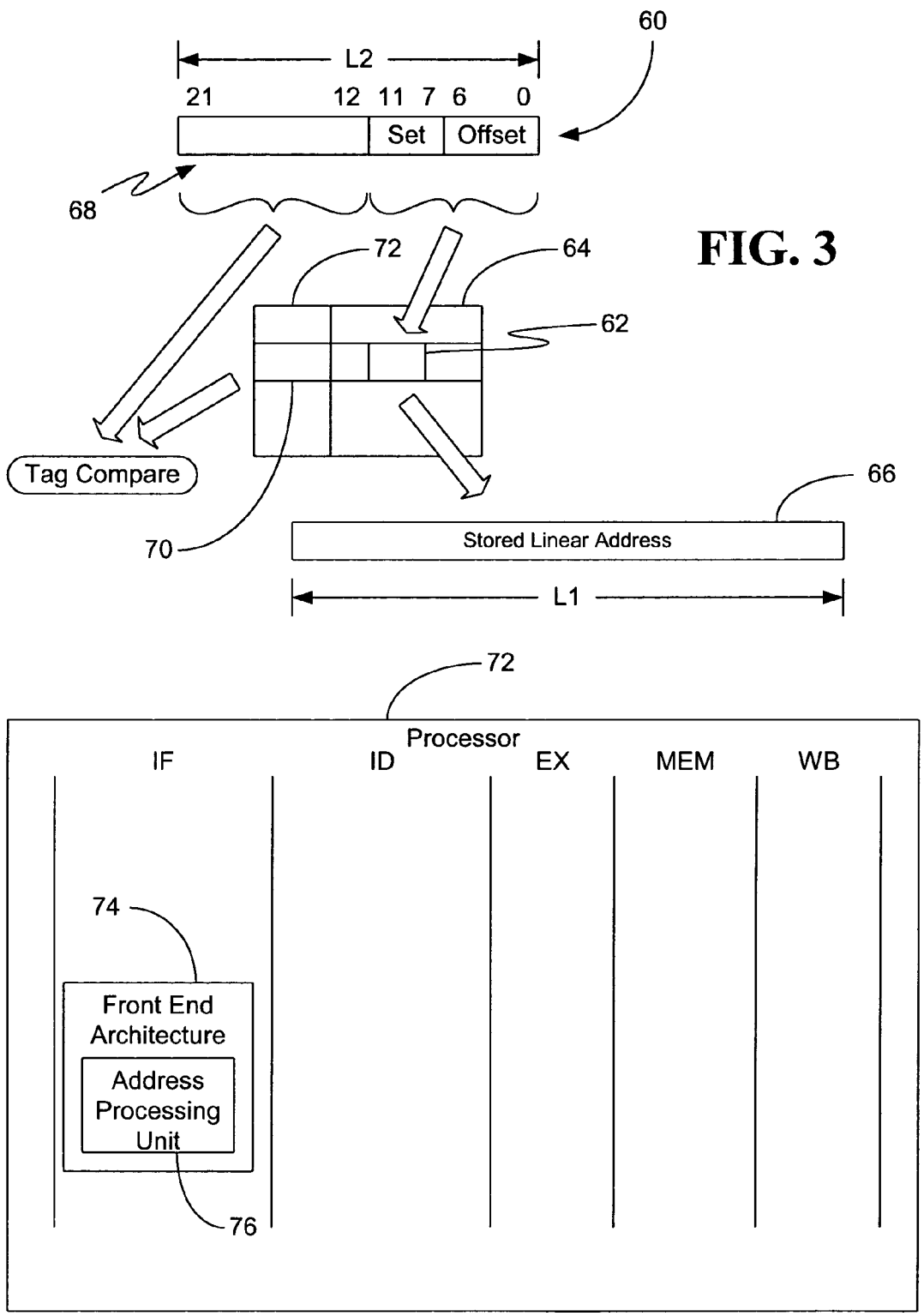
FIG. 3 is a diagram of an example a cache that is accessed with a reduced linear address according to one embodiment of the invention.

FIG. 3 illustrates the use of a reduced size branch prediction address 60 to retrieve a data block 62 from a data array 64, where the data block 62 includes a stored linear address 66. Branch prediction address 60 can be readily substituted for branch prediction address 58 (FIG. 2). Branch prediction address 60 has a reduced subset of bits 68, which are compared to the tag 70 in tag array 72 that corresponds to data block 62. It can be seen that the stored linear address 66 has a size that equals the size of the full linear address 26 (FIG. 2). Data array 64 and tag array 72 are part of a data structure of a cache. The cache may be a trace cache, instruction cache, etc.

Figure 4:
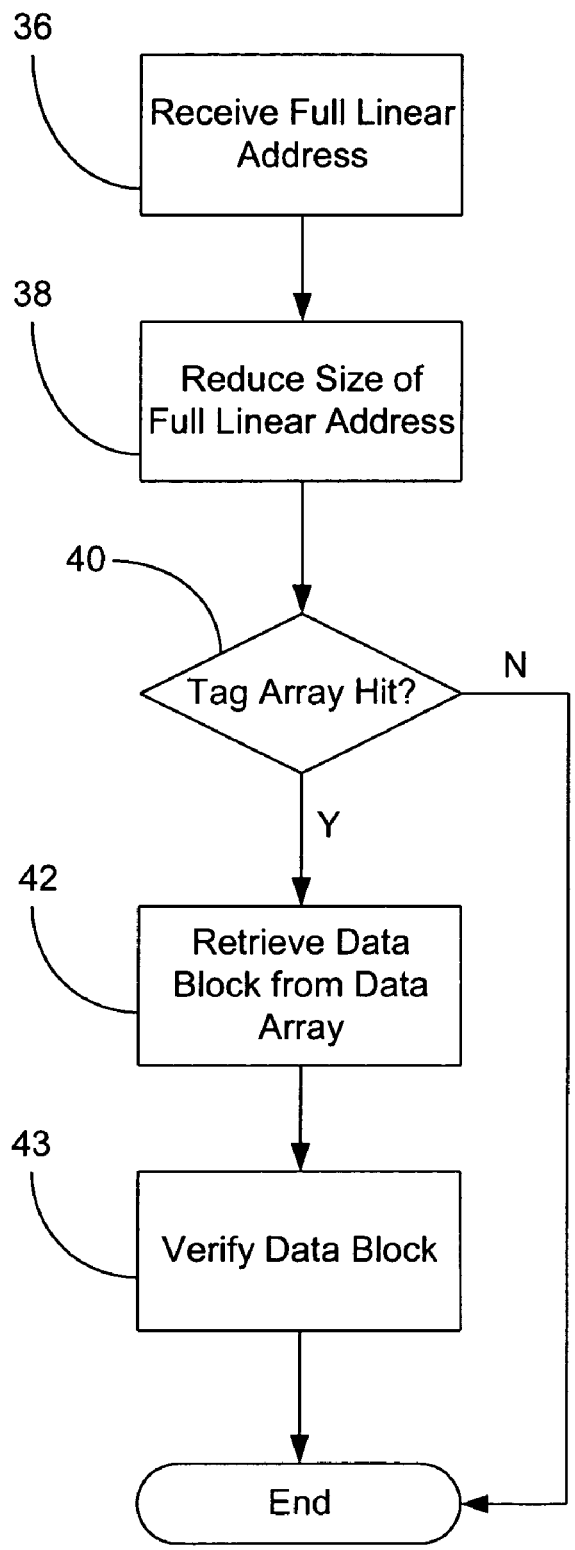
FIG. 4 is a flowchart of an example of a method of processing addresses according to one embodiment of the invention.

FIG. 4 shows a method 34 of processing addresses. Method 34 can be implemented using any commercially available hardware and/or programming techniques. For example, method 34 can be implemented as a set of instructions capable of being executed by processor, where the instructions are stored in a machine-readable medium such as random access memory (RAM), read only memory (ROM), etc.

A full linear address is received at processing block 36 and the size of the full linear address is reduced at block 38 to obtain a reduced linear address. If it is determined at block 40 that the reduced linear address corresponds to a tag in a tag array, where the tag array is associated with a data array, a data block is retrieved from the data array at block 42. Block 43 provides for verifying the retrieved data block. Specifically, it can be verified that either the data block is consecutive with respect to a previous data block or the stored linear address corresponds to a calculated branch target address.

Turning now to FIG. 5, a processor 72 having one or more pipelines defined by stages instruction fetch (IF), instruction code (ID), execute (EX), memory (ME), and writeback (WB). The instruction fetch portion of the pipeline has a front end architecture 74 with an address processing unit 76. Front end architecture 10 (FIG. 1) can be readily substituted for front end architecture 74, and address processing unit 44 (FIG. 1) can be readily substituted for address processing unit 76.

Figure 6:
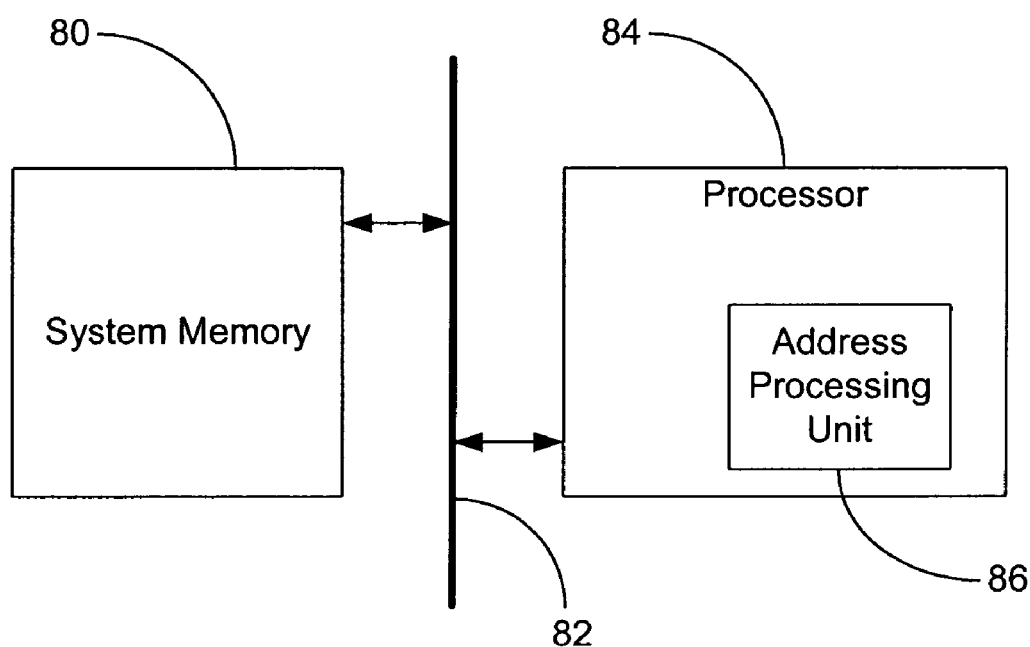
FIG. 6 is a block diagram of an example of a computer system according to one embodiment of the invention.

FIG. 6 shows a computer system 78 having a system memory 80 such as a random access memory (RAM), read only memory (ROM), flash memory, etc., a system bus 82 coupled to the system memory 80 and a processor 84 coupled to the bus 82, where the processor 84 receives instructions from the system memory 80 and includes an address processing unit 86. The address processing unit 86 can be similar to address processing unit 44 (FIG. 1). While the illustrated computer system 78 retrieves the instructions from system memory 80, the instructions may also be retrieved from any appropriate "on chip" memory such as a trace cache, instruction cache, etc.

Those skilled in the art can appreciate from the foregoing description that the broad techniques of the embodiments of the present invention can be implemented in a variety of forms. For example, branch prediction can make use of bimodal, local, global and other techniques while benefiting from the principles described herein. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of processing addresses, comprising:
receiving a full linear address of an instruction; and
reducing a size of the full linear address to obtain a reduced linear address by using a number of bits of the full linear address to generate a number of bits less than the used number of bits of the full linear address; and
retrieving a data block from a data array if the reduced linear address corresponds to a tag in a tag array, the tag array being associated with the data array, wherein the data block includes an address having a size that equals a size of the reduced linear address.

2. The method of claim 1, further including hashing a subset of the full linear address to reduce the size of the full linear address.

3. The method of claim 2, wherein the full linear address includes one or more line offset bits and one or more set index bits, the method further including isolating the offset bits and the set index bits from the hashing.

4. The method of claim 2, further including hashing a thread signature with the subset of the full linear address.

5. The method of claim 1, wherein the data array is a prediction array of a branch predictor, the data block including a branch prediction address having a size that equals a size of the reduced linear address.

6. The method of claim 1, wherein the data array is a cache array of a cache, the data block including a stored linear address having a size that equals the size of the full linear address.

7. The method of claim 6, further including verifying that either the data block is consecutive with respect to a previous data block or the stored linear address corresponds to a calculated branch target address.

8. The method of claim 7, wherein the cache is an instruction cache, the method further including decoding the data block.

9. The method of claim 7, wherein the cache is a trace cache.

10. A method of retrieving data, comprising:
receiving a full linear address of an instruction;
reducing a size of the full linear address to obtain a reduced linear address, the reducing including hashing a subset of the full linear address to generate a number of bits less than the used number of bits of the full linear address;

isolating one or more cache line offset bits of the full linear address and one or more set index bits of the full linear address from the hashing; and retrieving a data block from a data array if the reduced linear address corresponds to a tag in a tag array, the tag array being associated with the data array, wherein the data block includes an address having a size that equals a size of the reduced linear address.

11. The method of claim 10, wherein the data array is a prediction array, the data block including a branch prediction address having a size that equals a size of the reduced linear address.

12. The method of claim 10, wherein the data array is a cache array, the data block including a stored linear address having a size that equals the size of the full linear address.

13. The method of claim 12, further including verifying that either the data block is consecutive with respect to a previous data block or the stored linear address corresponds to a calculated branch target address.

14. The method of claim 13, wherein the cache is an instruction cache, the method further including decoding the data block.

15. The method of claim 13, wherein the cache is a trace cache.

16. An address processing unit comprising:
a data structure having a data array and a tag array;
a reduction module to reduce a size of a full linear address of an instruction to obtain a reduced linear address said reduction module to use bits of the full linear address to generate a number of bits for the reduced linear address less than the used number of bits of the full linear address; and
a retrieval module to retrieve a data block from the data array if the reduced linear address corresponds to a tag in the tag array, the tag array being associated with the data array, wherein the data block includes an address having a size that equals a size of the reduced linear address.

17. The address processing unit of claim 16, wherein the reduction module is to hash a subset of the full linear address to reduce the size of the full linear address.

18. The address processing unit of claim 17, wherein the full linear address is to include one or more line offset bits and one or more set index bits, the reduction module to isolate the offset bits and the set index bits from the hashing.

19. The address processing unit of claim 16, wherein the data array is a prediction array of a branch predictor, the data block to include a branch prediction address having a size that equals a size of the reduced linear address.

20. The address processing unit of claim 16, wherein the data array is a cache array of a cache, the data block to include a stored linear address having a size that equals a size of the full linear address.

21. The address processing unit of claim 20, further including an allocation module to verify that either the data block is consecutive with respect to a previous data block or the stored linear address corresponds to a calculated branch target address.

22. The address processing unit of claim 21, wherein the cache is an instruction cache, the architecture further including a decoder to decode the data block.

23. The address processing unit of claim 21, wherein the cache is a trace cache.

24. A computer system comprising:
a random access memory;
a bus coupled to the memory; and
a processor coupled to the bus, the processor to receive an instruction from the memory and including an address processing unit having a data structure, a reduction module and a retrieval module, the data structure having a data array and a tag array, the reduction module to reduce a size of a full linear address of the instruction to obtain a reduced linear address, said reduction module to use bits of the full linear address to generate a number of bits for the reduced linear address less than the used number of bits of the full linear address, the retrieval module to retrieve a data block from the data array if the reduced linear address corresponds to a tag in the tag array, the tag array being associated with the data array, wherein the data block includes an address having a size that equals a size of the reduced linear address.

25. The computer system of claim 24, wherein the reduction module is to hash a subset of the full linear address to reduce the size of the full linear address.

26. The computer system of claim 25, wherein the full linear address is to include one or more line offset bits and one or more set index bits, the reduction module to isolate the offset bits and the set index bits from the hashing.

* * * * *